United States Patent [19]

Gross

[11] Patent Number: 4,875,805

[45] Date of Patent: Oct. 24, 1989

[54] TOXIC WASTE STORAGE FACILITY

[76] Inventor: Robert Gross, 175 Drennen Rd., Orlando, Fla. 32806

[21] Appl. No.: 240,527

[22] Filed: Sep. 6, 1988

[51] Int. Cl.⁴ .............................................. B09B 3/00
[52] U.S. Cl. .................................. 405/128; 405/54; 405/55; 405/270
[58] Field of Search ............... 405/128, 129, 270, 271, 405/54, 38, 452; 52/169.5, 169.6, 169.7, 169.14

[56] References Cited

U.S. PATENT DOCUMENTS

| | | | |
|---|---|---|---|
| 2,003,618 | 6/1935 | White | 52/519 X |
| 4,335,978 | 6/1982 | Mutch | 405/129 |
| 4,362,434 | 12/1982 | Valiga et al. | 405/128 |
| 4,375,930 | 3/1983 | Valiga | 405/128 |
| 4,406,403 | 9/1983 | Luebke | 405/270 X |
| 4,464,081 | 8/1984 | Hillier et al. | 405/128 |
| 4,569,649 | 2/1986 | Gross | 425/344 |
| 4,624,604 | 11/1986 | Wagner et al. | 405/128 |
| 4,778,628 | 10/1988 | Saha et al. | 405/128 X |

Primary Examiner—Dennis L. Taylor
Assistant Examiner—J. Russell McBee
Attorney, Agent, or Firm—Pearne, Gordon, McCoy & Granger

[57] ABSTRACT

A toxic waste storage facility is formed of a plurality of contiguous storage cells. Each of the storage cells has walls made from compacted earth blocks and has a floor of compacted layers of clay with an impervious plastic liner beneath the layers of clay. A plurality of liquid storage containers, each containing toxic waste, are stacked in each of the storage cells. Clay filler is located within the walls of the storage cells and fills the space around the containers.

9 Claims, 6 Drawing Sheets

Fig.9

TOXIC WASTE STORAGE FACILITY

BACKGROUND OF THE INVENTION

1. Field of the Invention

This invention relates to static structure and, more particularly, to an ongoing process specially adapted for the lifetime storage of toxic and hazardous waste.

2. Description of the Prior Art

Hazardous waste has been a product of urban society from its beginning. In the last few decades, however, the growth of chemical industries and the use of their products have increased the amount of wastes, and at the same time have increased the toxicity of some of these wastes. Recognition of the hazardous nature of these wastes has led many countries to impose severe restrictions on their storage and to introduce safety regulations which have significantly raised the costs for industry.

The implementation of many of these safety regulations often requires construction of an expensive facility for processing and storing toxic wastes. Even when expensive facilities are constructed, the possibilities of very long-term safe storage of toxic waste are limited, and these facilities often require extensive maintenance and supervision to remain effective and useful.

The most desirable sites for storing toxic waste are remote locations such as Third World or developing countries with vast remote area away from populated locations and natural resources. However, these sites also lack facilities and resources for the construction of safe storage facilities.

Thus, it would be desirable to provide a design for a hazardous waste storage facility that would provide for the safe lifetime storage of hazardous wastes and would permit construction from materials readily at hand, even in remote locations.

SUMMARY OF THE INVENTION

The present invention provides a hazardous or toxic waste storage facility which overcomes the prior art problems of the safe storing of hazardous waste and provides other advantages which have not been possible heretofore.

The present invention provides a facility in which toxic waste is stored as safely as possible, reducing the dangers associated with the storage of toxic waste, and providing redundancy in the event of leakage or spills. The facility of the present invention reduces the risk of fires and keeps toxic waste cool, preventing overheating of liquid waste, which could lead to premature leakage or even explosion.

By making use of earth blocks, clay and other noncombustible material, the facility of the present invention minimizes the potential for fire. Since these materials are noncombustible, the construction of the facility of the present invention almost totally eliminates the possibility of fire propagation.

Earth blocks provide special advantages in such construction. Earth is available in unlimited supply at no expense, and it is readily available at the site of construction even in remote locations. Because the blocks are very dense and flat, they can be dry-stacked, without mortar or similar material. An important advantage of earth blocks is that they are completely fireproof. Furthermore, earth blocks provide superior insulation qualities and very high liquid absorption. The liquid absorption properties of earth blocks are in sharp contrast with highly porous concrete blocks. In addition, earth is nontoxic and non-allergenic.

By reducing the possibility of fire and maintaining the waste in a cool environment, the possibility of a hazardous waste explosion and subsequent fire is reduced to near zero.

The hazardous waste storage facility of the present invention also includes an inherent ability to prove that the storage system is safe through check points and detectors built into the facility.

In accordance with the present invention, toxic waste storage containers are stacked with clay packed around and on top of them, and a metal shed is provided over the containers. The toxic waste storage containers are thus stored in an environment in which no water and very little oxygen can come in contact with the containers to promote corrosion of the containers. The clay seals the containers from humidity and air, thus reducing the vapor pressure and fire hazard to near zero. This permits the safe storage of toxic waste in containers in a revolving process for hundreds of years.

These and other advantages are provided by the toxic waste storage facility of the present invention. The facility comprises a plurality of contiguous storage cells. Each of the storage cells has walls made from compacted earth blocks. Each of the storage cells also has a floor of compacted layers of clay with an impervious plastic liner beneath the layers of clay. A plurality of liquid storage containers are stacked in each of the storage cells. Each of the containers contains toxic waste. Clay filler is located within the walls of the storage cells and fills the space around the containers.

DETAILED DESCRIPTION OF THE PREFERRED EMBODIMENT

Figure 1:
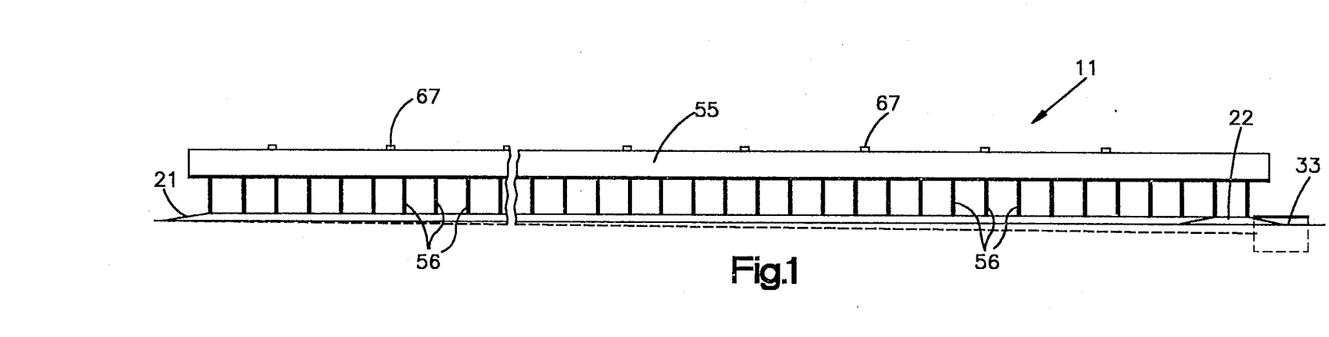
FIG. 1 is a side elevation of the toxic waste storage facility of the present invention.
Figure 2:
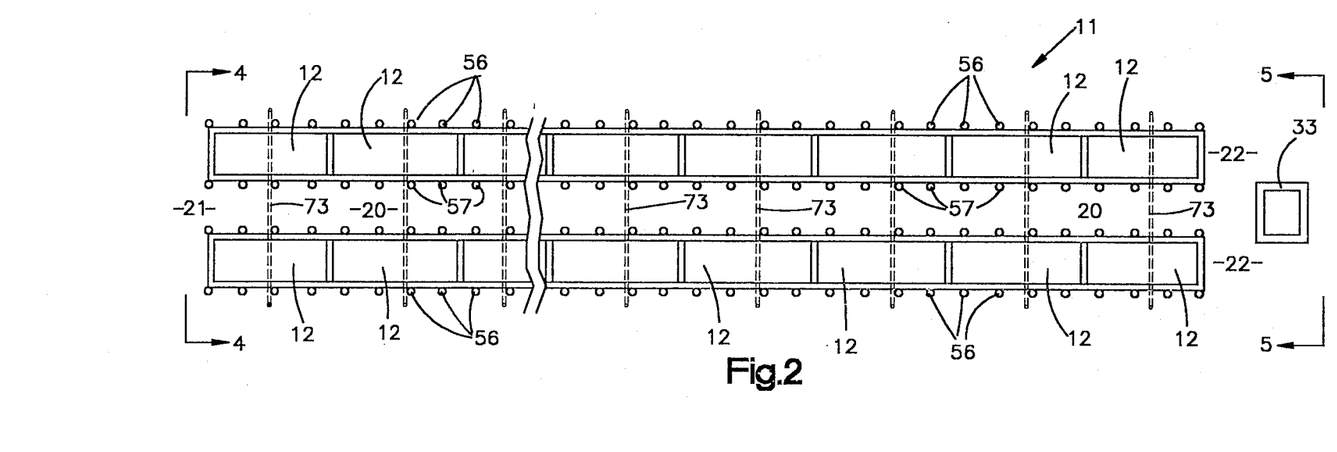
FIG. 2 is a plan view of the toxic waste storage facility of FIG. 1 with the roof removed.
Figure 3:
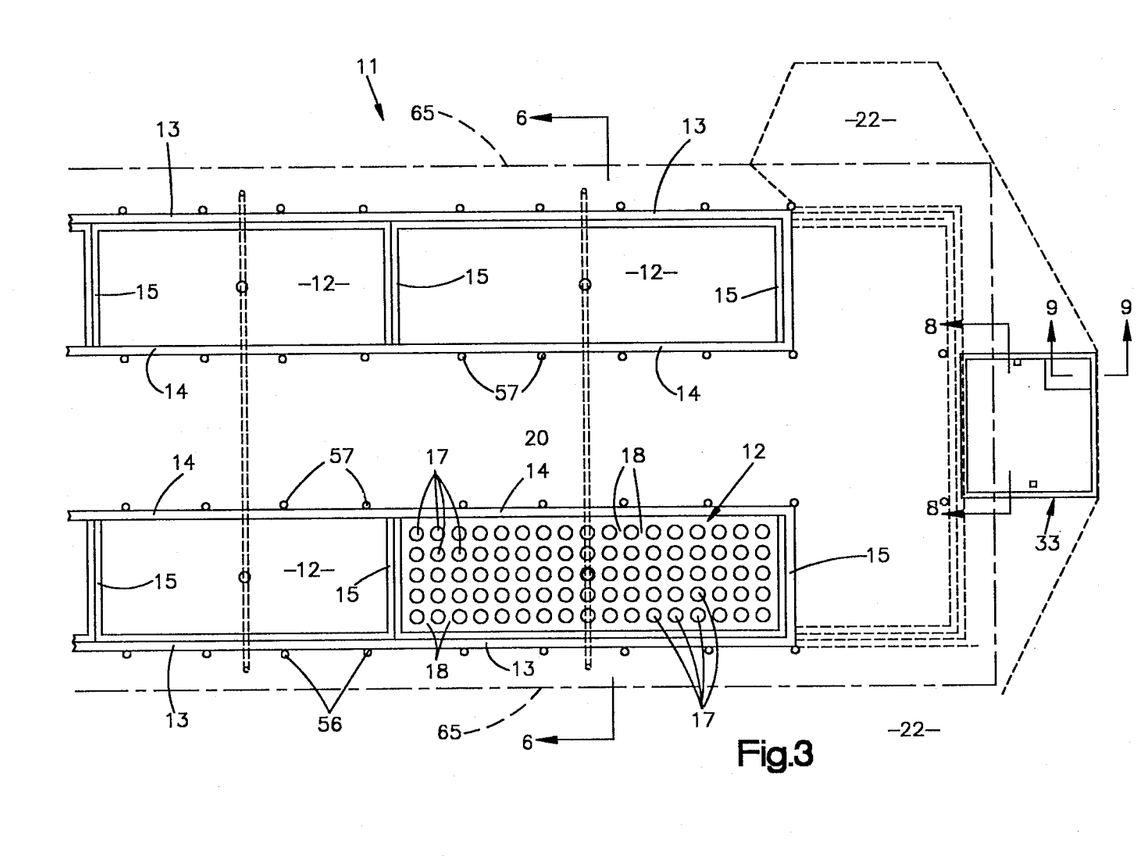
FIG. 3 is a detailed plan view of a portion of the toxic waste storage facility of FIG. 2 with the hazardous waste containers in place.
Figure 4:
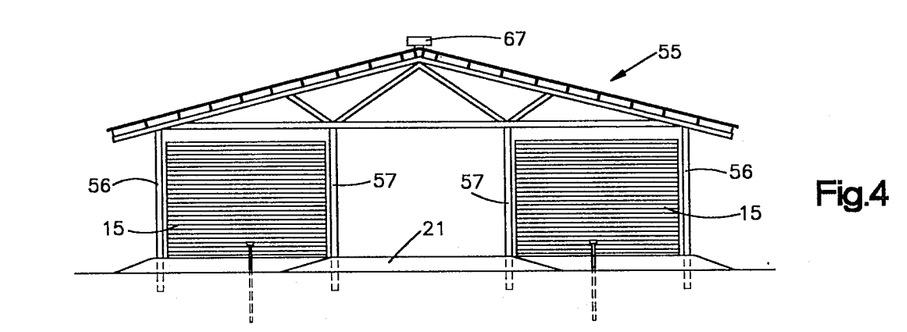
FIG. 4 is an end elevation taken along line 4—4 of FIG. 2.
Figure 5:
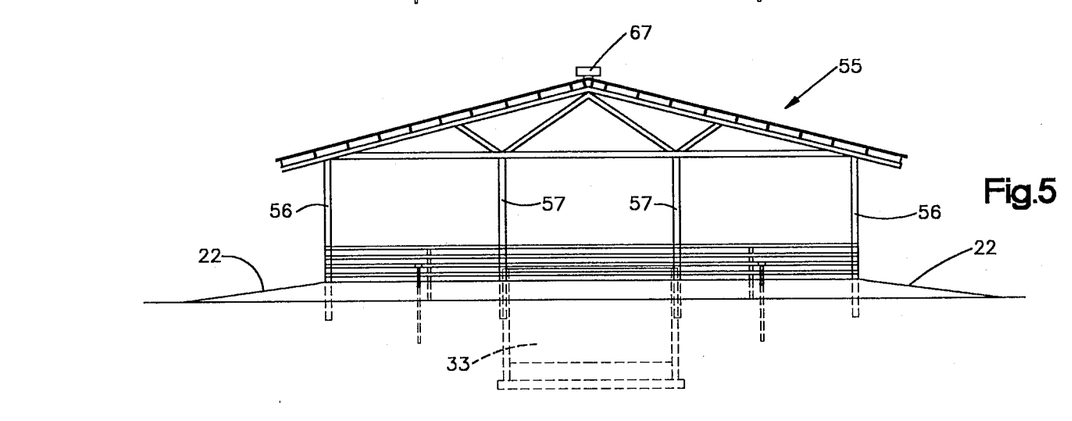
FIG. 5 is an end elevation taken along line 5—5 of FIG. 2.

Referring more particularly to the drawings, and initially to FIGS. 1 and 2, there is shown the toxic waste storage facility 11 of the present invention comprising two rows of storage cells 12. While the facility 11 shown is formed of two rows of 23 storage cells 12 each, the number of cells may be varied depending upon the location of the facility 11. As shown in FIG. 3, each storage cell 12 is defined by an outside wall 13, an inside wall 14, and two side walls 15. The outside wall 13 and the side walls 15 of each storage cell 12 are formed of a double layer of adobe or compacted earth blocks, each layer having a thickness of about 8 inches (20 cm), providing a wall which is approximately 16 inches (40 cm) thick. The inside wall 14 of each storage cell 12 is formed of a single layer of earth blocks. The individual earth blocks may be made using the machine shown in U.S. Pat. No. 4,569,649, the disclosure of which is hereby incorporated by reference. Such a machine is capable of rapidly making blocks having dimensions of approximately 16 inches (40 cm) long by 12 inches (30 cm) high by 8 inches (20 cm) deep.

Figure 6:
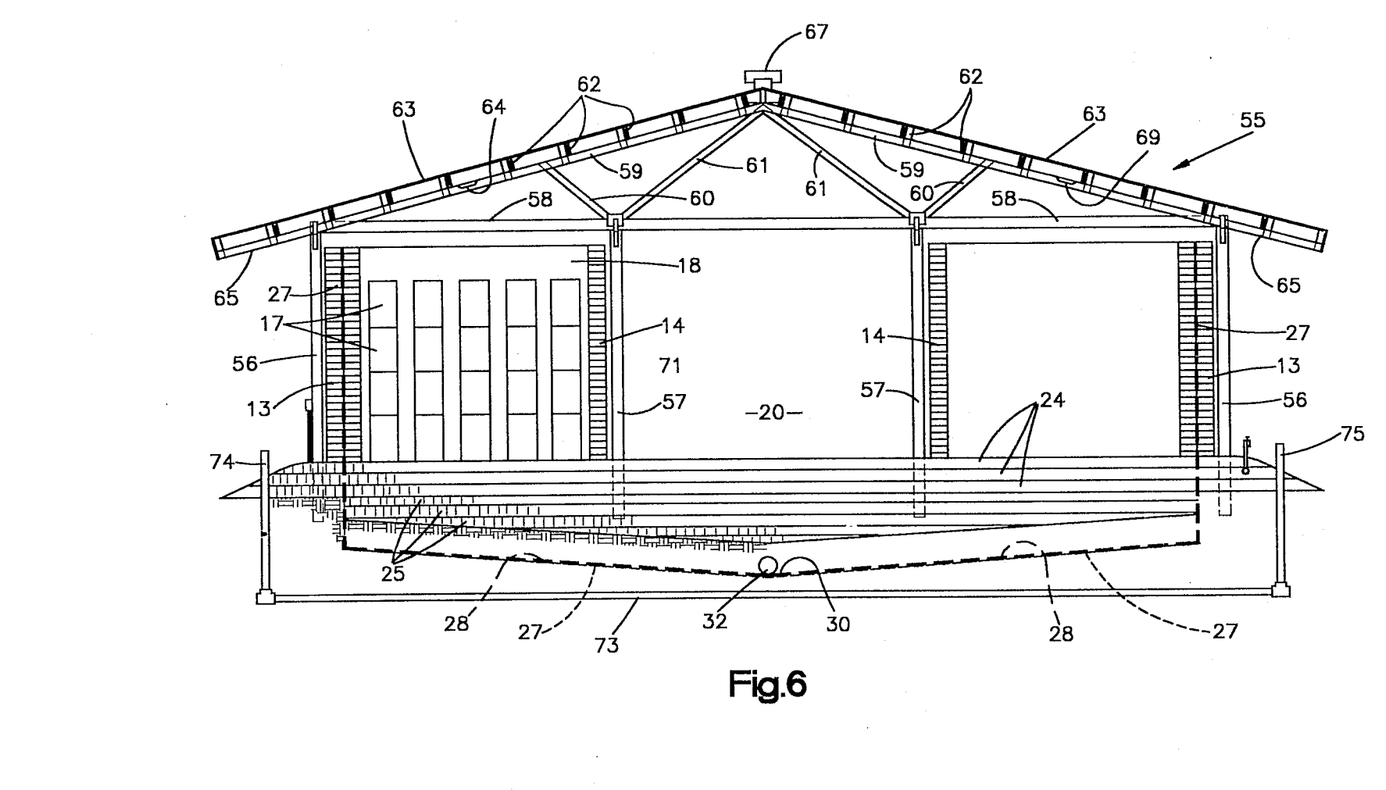
FIG. 6 is an end cross-sectional view taken along line 6—6 of FIG. 3.

Each of the storage cells 12 may have a width of about 20 feet (6 meters), but may vary in length. The typical storage cells 12 may have a length of 40 feet (12 meters), and be capable of storing 260 55-gallon (240-liter) containers or drums 17, arranged thirteen containers long and five containers deep and stacked four containers high. The larger storage cells 12 may have a length of 52 feet (16 meters), and be capable of storing as many as 340 55-gallon (240-liter) containers 17, arranged seven containers long and five containers deep and stacked four containers high. After the containers 17 have been placed in the storage cell 12, the area between the containers is filled with compacted clay 18 (FIGS. 3 and 6). The clay 18 is provided to hold the storage containers in place, to isolate the containers from the air, and to prevent leakage of the containers as much as possible.

Between the two rows of storage cells 12 is a driveway 20. The driveway 20, which extends between the inside walls 14, has a width of approximately 20 feet (6 meters) and extends the entire length of the facility 11. The driveway 20 is slightly above grade level and is connected to ramps 21 and 22 at each end of the facility to provide access up to the driveway. The ramp 21 at one end of the facility (the left end as shown in FIGS. 1 and 2) extends parallel to the driveway 20 and effectively forms an extension of the driveway. The ramp 22 at the other end of the facility (the right side as shown in FIGS. 1 and 2) extends perpendicular to the driveway 20 and may be formed of two identical ramps extending from each side of the driveway.

As shown in FIG. 6, each storage cell 12 has a floor formed of a plurality of layers 24 and 25 of compacted clay fill. Preferably, three 8-inch (20-cm) layers 24 of compacted clay fill are provided above ground level, and additional layers 25 are provided below ground level. The clay layers 24 and 25 provide support for the containers 17 and provide an initial barrier to any toxic liquid that may leak from the containers.

The clay layers 25 below ground level are contained within a bed of an impervious plastic liner 27 which extends beneath the entire facility. The liner 27 may be formed of a 50-mil thickness of Hypolon film. Hypolon film is a Teflon-impregnated fiberglass reinforced film that is totally impervious to any chemical on either side of 7.5 pH, and is commercially available from E. I. du Pont de Nemours & Co., Inc. of Wilmington, Del., U.S.A. A layer of a geo-textile fabric 28 is provided on top of the liner 27. The fabric 28 is preferably a ⅛-inch (3-mm) thick continuous filament, non-woven, needle punched polyvinyl-chloride blanket.

The liner 27 provides a second barrier to any toxic liquid that may leak from the containers 17 and leak through the clay 18 and the clay layers 24 and 25. The liner 27 below ground is V shaped, forming a low point 30 located approximately beneath the midline of the driveway 20. The liner 27 extends upwardly from the floor 24 on each side of the facility to the base of the outside walls 13, and extends between the two layers of blocks that form the outside walls 13 of the storage cells 12.

Since the liner 27 below ground is V shaped, the liner 27 slopes downwardly from the storage cell outside walls 13 to the low point 30 located beneath the midline of the facility 11. The low point 30 extends longitudinally from one end of the facility to the other, and thus forms a groove extending the length of the facility beneath the center of the driveway 20. A perforated pipe 32 is provided in this groove on top of the liner 27. The groove in the liner 27 formed by the low point 30 slopes (from left to right as shown in FIGS. 1 and 2) downwardly to a cistern 33 located at one end of the facility 11 (the right end as shown in FIGS. 1, 2 and 3), so that any toxic liquid that escapes from the containers 17 and leaks through the clay layers 24 is captured by the liner 27 and drains into the cistern 33.

Figure 9:
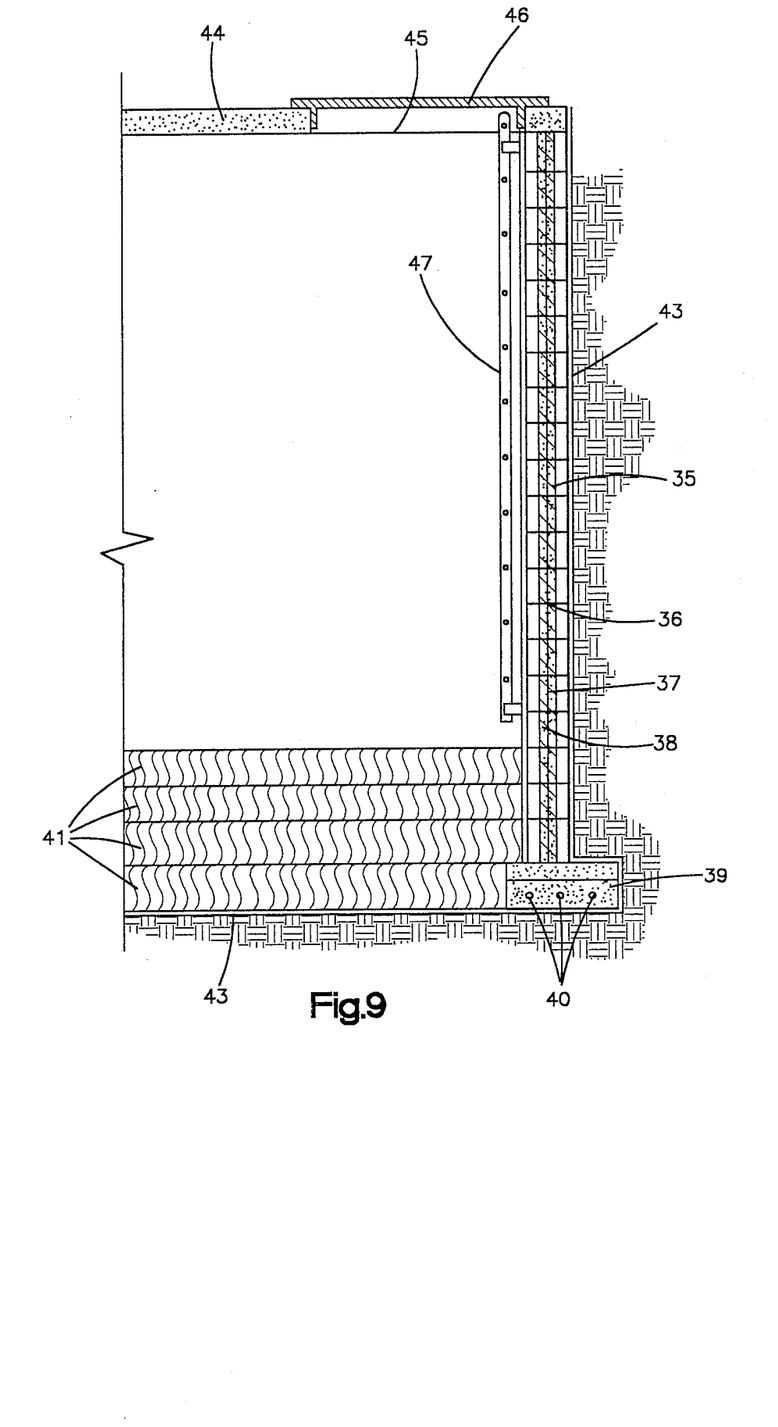
FIG. 9 is a side sectional view taken along line 9—9 of FIG. 7.

The cistern 33 is located at one end of the facility 11 at the end of the driveway 20 where the ramps 22 extend perpendicular to the direction of the driveway. As shown in FIG. 9, the cistern 33 has walls 35 formed of hollow concrete blocks 36 with the hollow openings within the blocks filled with concrete 37 and reinforced with vertical reinforcement bars 38. At the foot of each wall 35 is a base 39 formed of concrete with horizontal reinforcement bars 40. The floor of the cistern 33 is formed of a plurality of layers 41 of speedy-dry clay. Speedy-dry clay is well known and is commonly used in service stations and garages to absorb oils and contaminants. Commercially available speedy-dry clay is typically rapid expanding lattice bentonite clay that has been kiln dried and has a great affinity to absorb liquids into the minute clay faction. The clay layers 41 in the floor are used to absorb toxic liquid, which is then picked up with a non-spark shovel and packed into new 55-gallon (240-liter) containers which may be removed elsewhere for continued storage.

The entire cistern 33 is lined with a layer of a barrier liner 43, such as Hypolon liner. The liner 43 extends beneath the layers 41 of clay forming the cistern floor, and extends on the outside of the walls 35. The top of the cistern 33 is covered by a reinforced concrete slab 44. An access opening 45 is provided in the slab 44. The opening 45 is covered by a removable plate 46. A ladder 47 mounted on one of the walls 35 of the cistern 33 extends vertically down from the access opening 45 into the cistern.

Figure 7:
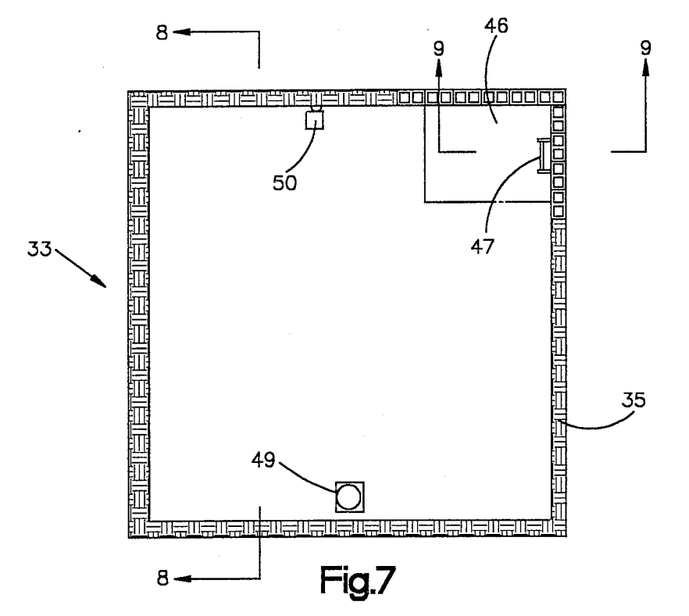
FIG. 7 is a detailed plan view of the cistern of FIG. 3.

As shown in FIG. 7, a spark-proof lamp 49 is provided inside the cistern 33. The lamp 49 is preferably a light fixture having a heavy Pyrex cover and a rubber seal that reduces the risk of sparks in case the light bulb should explode. A suitable lamp is available from W. W. Grainger, Inc. of Chicago, Ill., U.S.A. A vapor detector 50 is located within the cistern 33. The vapor detector 50 is a variable sensitivity adjustment, standard industry gas detector that sounds an alarm for any concentration of non-standard air particles.

Figure 8:
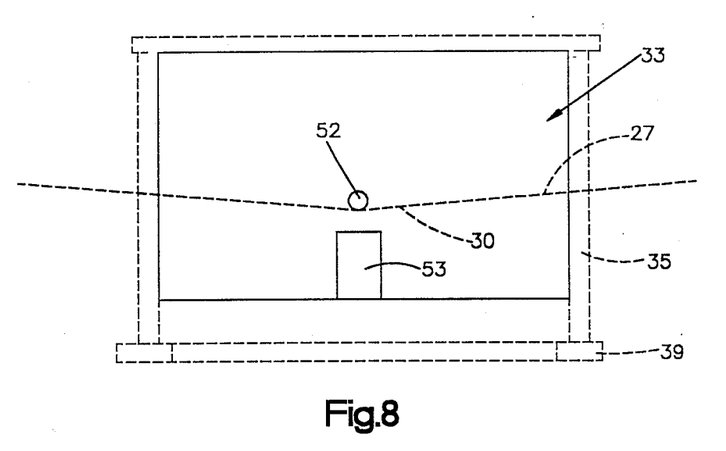
FIG. 8 is an end sectional view taken along line 8—8 of FIG. 7.

As shown in FIG. 8, a drain pipe 52 connects the perforated pipe 32 on the low point 30 inside the liner 27 to the cistern 33. A 55-gallon (240-liter) container 53 is located in the cistern beneath the drain, so that any toxic liquid which leaks from any of the storage cells 12 will drain into the cistern. When the container 53 is filled, it can be removed for further storage.

The layer of a geo-textile fabric 28 provided on top of the liner 27 gives the toxic liquid a raceway to the cistern 33. Even though it is tightly compressed against the liner 27 by the very dense clay above it, it allows for rapid migration of the liquid to the cistern 33. The fabric 28 also functions to capillary any liquid across any minute puncture that may have occurred in the liner 27 during installation or afterward.

To protect the facility from rain, the storage cells 12 and the driveway 20 are covered by a roof structure 55 supported by a plurality of support posts 56 and 57 which may be made from common 15-feet (4.5 meters) high telephone poles. The posts 56 and 57 are spaced approximately 11⅝ feet (3.5 meters) apart, and are arranged in four rows, two rows of posts 56 located just outside the outside walls 13, and two rows of posts 57 located just inside the inside walls 15. Supported by the two pairs of posts 56 and 57 is a horizontal beam 58 as shown in FIG. 6. Above the horizontal beam 58 are roof trusses 59 directly supported on the outside posts 56 and indirectly supported on the inside posts 57 by truss members 60 and 61. A plurality of purlins 62 are attached to the roof trusses 59, and roof panels 63 are mounted on the purlins 62 to provide the finished roof. Suitable roof panels are Pro-Panel II galvanized steel panels available from Metal Sales Mfg. Corp. of Louisville, Ky., U.S.A.

The finished roof structure 55 provides eaves or an overhand 65 on each side of the facility 11. The overhand 65 is preferably about 6 feet (2 meters) beyond the outside posts 56.

A plurality of circular vents 67 are located on the ridge of the roof structure 55, with one vent 67 centered over the location of each pair of storage cells 12.

A gas detector 69 is located over each storage cell 12. The gas detectors 69 are variable sensitivity adjustment, standard industry gas detectors that sound an alarm for any concentration of nonstandard air particles. Each gas detector 69 is mounted to one of the roof trusses 59.

Each of the storage cells 12 may also be provided with an identification plate 71 made of a heavy brass material so that the information on the plate will be preserved as long as possible. The plate 71 may be used to mark the contents of the containers 17 within the cell 12 and the date that the containers were sealed inside the cell.

To detect any leaks in the liner 27, a leak detection system is provided in the form of a plurality of perforated pipes 73 which extend under each pair of storage cells 12 beneath the liner 27. As shown in FIG. 6, the pipes 73 extend perpendicular to the driveway 20 across the width of the facility, and one of the pipes 73 is provided for each of the pair of storage cells 12 disposed on opposite sides of the driveway. Riser pipes 74 and 75 extend upwardly from each end of each of the pipes 73 to provide access to the pipes 73. One of the riser pipes 75 provides for filling the pipe 73 with potable water. A hose bibb 76 is provided near the top of each of the riser pipes 75 for attaching the pipe to a water hose so that the pipe 73 can be filled with water. The other of the riser pipes 74 provides for pumping the water from the pipe 73. The pipe 73 contains small perforations which allow any contamination to seep into the pipe. If any toxic liquid leaks through the containers 20, through the clay 18, through the clay layers 24 and 25, and through the liner 27, some will enter the pipes 73. When the pipe 73 is filled with water, this contamination will, in turn, contaminate the water inside the pipe. Periodically, the pipe 73 should be filled with water through the riser pipe 75 and extracted through the riser pipe 74 and analyzed to prove that the facility is not contaminating the ground.

The toxic waste storage facility 11 may be assembled as follows. The site of the facility is excavated and the leak detection system comprising the pipes 73, 74 and 75 is installed. The cistern 33 is constructed, the site is graded, and the liner 27 is laid in place followed by the fabric layer 28. The clay layers 24 and 25 are then put in place and the driveway 20 and the ramps 21 and 22 are constructed, so that the facility is ready to accept the delivery of toxic substances. Preferably, the roof structure 55 is completed before toxic material arrives at the site to protect the storage cells as they are constructed.

The toxic material is delivered to the facility in standard 55-gallon (240-liter) barrels or containers. As the containers are delivered, they are stacked in the location of each of the cells 12. The walls 13, 14, and 15 of each cell are constructed, using the machine disclosed in U.S. Pat. No. 4,569,649, or other similar device. Clay 18 is placed around the containers as the cell is constructed to seal the containers in place.

In use, the storage facility 11 functions to contain the toxic material stored therein for as long as possible, and facilitates cleanup when the waste eventually begins leaking. For example, suppose that a container of polychloride biphenyl (PCB), which is used by the millions of gallons in transformers worldwide, is brought to the facility 11 in a marked, good-quality standard 55-gallon (240-liter) container. The container is stored in one of the storage cells 12 and the plate 71 on the cell is marked with the contents of the container and date that the container was sealed inside the cell.

Perhaps, thirty years later, the container may spring its first minute leak due to the rusting away of the sides of the container. The liquid gravitates down through the clay 18 and through the layers 24 and 25 of clay forming the floor of the cell to the liner 27, where it is mixed along with other liquids that may have leaked. Over a period of time, the liquid works its way into the perforated pipe 32 through the drainpipe 52 and into the cistern 33. In the cistern 33, the liquid may be collected in another container beneath the pipe 52, or the liquid may be absorbed into the speedy-dry clay 41 forming the floor of the cistern. The clay 41 that has absorbed this material is then repacked into a new container which is sealed and stored in a new cell. Because the liquid has mixed with the clay, it is bound into the clay particles and is no longer in liquid form, so that it should last much longer, perhaps a century, before this cycle repeats itself.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A toxic waste storage facility comprising:
   a plurality of contiguous above-ground storage cells, each of the storage cells defined by substantially vertical walls constructed from separate compacted earth blocks, the walls enclosing each of the storage cells and isolating each storage cell from each adjacent storage cell, each of the storage cells having a floor of compacted layers of clay with an impervious plastic liner beneath the layers of clay;

a plurality of liquid storage containers stacked in each of the storage cells, each of the containers containing toxic waste; and clay filler located within the walls of the storage cells and filling the space around the containers.

2. A toxic waste storage facility as defined in claim 1, comprising in addition:

a cistern located at one end of the plurality of contiguous storage cells, at least a portion of the cistern being located below the level of the clay floor, the cistern continuously receiving drainage downwardly from the clay floor.

3. A toxic waste storage facility as defined in claim 1, comprising in addition:

a leak detector system comprising a plurality of porous pipes extending beneath the storage cells, each of the porous pipes having a riser at each end providing a pair of risers for each pipe, one of the risers for filling the pipe with liquid and the other of the risers for recovering the liquid.

4. A toxic waste storage facility as defined in claim 1, wherein the storage cells are arranged in two rows, and comprising in addition:

a driveway between the two rows of storage cells providing access to the cells.

5. A toxic waste storage facility as defined in claim 4, comprising in addition:

a roof structure covering the two rows of cells and the driveway therebetween.

6. A toxic waste storage facility as defined in claim 1, comprising in addition:

a roof structure covering the storage cells.

7. A toxic waste storage facility as defined in claim 6, wherein the roof structure includes a overhand to protect the compacted earth walls.

8. A toxic waste storage facility as defined in claim 6, comprising in addition a plurality of vapor detectors supported on the roof structure and located above each of the storage cells.

9. A toxic waste storage facility as defined in claim 1, wherein comprising in addition a layer of fabric over the impervious plastic liner, the fabric layer acting to capillary any liquid across any minute puncture that may have occurred in the liner.

* * * * *

UNITED STATES PATENT AND TRADEMARK OFFICE
CERTIFICATE OF CORRECTION

PATENT NO. : 4,875,805

DATED : October 24, 1989

INVENTOR(S) : Robert Gross

It is certified that error appears in the above-identified patent and that said Letters Patent is hereby corrected as shown below:

Column 4, Line 20, "ramps" should read --ramp--.

Column 5, Lines 27 and 28, "overhand" should read --overhang--.

Column 8, Line 14, "overhand" should read --overhang--.

Signed and Sealed this

Sixteenth Day of July, 1991

Attest:

HARRY F. MANBECK, JR.

Attesting Officer

Commissioner of Patents and Trademarks